UNITED STATES PATENT OFFICE.

JOHN F. WERDER, OF DENVER, COLORADO, ASSIGNOR TO ZIP MANUFACTURING COMPANY, OF DENVER, COLORADO, A CORPORATION OF COLORADO.

GRINDING COMPOUND.

1,353,197. Specification of Letters Patent. Patented Sept. 21, 1920.

No Drawing. Application filed August 8, 1918. Serial No. 248,960.

*To all whom it may concern:*

Be it known that I, JOHN F. WERDER, a citizen of the United States, residing at Denver, in the county of Denver and State of Colorado, have invented certain new and useful Improvements in Grinding Compounds, of which the following is a specification, reference being had therein to the accompanying drawings.

This invention relates to a grinding compound for use in the grinding of valves of gas engines, pumps and any and all other work requiring the use of an abrasive compound.

The object of the invention is the production of a highly efficient grinding compound that has one of its ingredients, a binder that will permit of the greatest amount of friction.

With this and other objects in view the invention comprises the production of a compound that involves as the abrasive element, carborundum pulverized to a suitable mesh, graded according to the work to be done, and then as the binder, starch, or other soluble, glutinous substance, and the liquid used is water, for mixing the powdered carborundum and starch or other aforesaid binders together.

It is also desirable to use, a formalin in the compound, as a preservative, to prevent the starch or other aforesaid binders from deteriorating or becoming musty. Other binders may be used besides starch such as flour, or other easily soluble, glutinous substance, but the best result is attained by the specific novel combination of pulverized carborundum, starch and water with a suitable preservative, preferably formalin.

The specific proportion of the compound is as follows:

10 parts pulverized carborundum;
1 to 2 parts starch (varying according to grade of carborundum used);
10 to 20 parts water; and
1/30 to 1/50 part formalin.

In mixing and combining the ingredients of the compound, equal quantities of starch and water (preferably cold water) are first mixed and thereafter the mixture is stirred until it forms a thick paste; then I add the remaining parts of water (preferably cold water) and pulverized carborundum, stirring thoroughly. This mixture is then subjected to moderate heat, sufficient to bring it to a boil, stirring constantly. When the mixture reaches boiling point, hold same thereat for about thirty seconds, then remove from the fire. Immediately after removing mixture from the fire, and as the temperature lowers from boiling point, add formalin, stirring the same in thoroughly.

While the mixture is warm, it then may be put in containers ready for use.

It must be understood that I do not limit this invention to the above proportions for such ingredients, since these proportions may be varied considerably, without departing from the spirit and intent of the invention as defined by the appended claims.

This compound is then used with water instead of oil, thus utilizing all of the friction obtainable from the carborundum.

In the ordinary compounds upon the market it is found that most of them employ oil as the ingredient for mixing, and the greatest amount of friction cannot be obtained by the character of the oil itself, whereas with water as the mixing ingredient, the greatest amount of friction will be obtained.

This compound, by reason of the starch, or other glutinous binder, easily soluble in water, by the combined action of the friction and water, releases more evenly the powdered grains of carborundum so as to accomplish, in use, what you might call a cushioning and more even and ready distribution, with greater freedom from the sticking or adhering in one place by the abrasive grains, as in the case of abrasives employing oil, thereby avoiding the making of grooves and uneven surfaces, and with greater rapidity producing a more evenly ground surface.

What I claim is:

1. A metal grinding preparation free from oil comprising powdered carborundum, starch and water.

2. A metal grinding preparation free from oil comprising a powdered abrasive, water, and a water-soluble glutinous binder.

In testimony whereof I hereunto affix my signature.

JOHN F. WERDER.